(12) United States Patent
Small

(10) Patent No.: US 8,210,488 B2
(45) Date of Patent: Jul. 3, 2012

(54) BASE/LIFTING STRUCTURE

(75) Inventor: Jeremy Small, Plymouth, MN (US)

(73) Assignee: AAF-McQuay Inc., Minneapolis, MN (US)

( * ) Notice: Subject to any disclaimer, the term of this patent is extended or adjusted under 35 U.S.C. 154(b) by 602 days.

(21) Appl. No.: 12/330,025

(22) Filed: Dec. 8, 2008

(65) Prior Publication Data

US 2009/0146040 A1 Jun. 11, 2009

Related U.S. Application Data

(60) Provisional application No. 61/012,201, filed on Dec. 7, 2007.

(51) Int. Cl.
*B65D 19/00* (2006.01)

(52) U.S. Cl. ............... 248/346.01; 248/676; 248/188.1; 108/51.11

(58) Field of Classification Search ............. 248/346.01, 248/637, 678, 647, 328, 329, 332, 674, 676, 248/188.1; 108/51.11, 57.2; 294/68.1, 68.3; 220/1.5

See application file for complete search history.

(56) References Cited

U.S. PATENT DOCUMENTS

| | | | | |
|---|---|---|---|---|
| 4,216,933 | A | * | 8/1980 | Cramer, Jr. ............. 248/188.5 |
| 4,660,799 | A | * | 4/1987 | Butland ................... 248/676 |
| 5,069,143 | A | * | 12/1991 | Bunger ................... 108/57.2 |
| 5,820,092 | A | * | 10/1998 | Thaler ..................... 248/237 |
| 5,895,025 | A | | 4/1999 | Alesi et al. |
| 7,128,302 | B2 | | 10/2006 | Dubensky et al. |
| 7,402,002 | B2 | | 7/2008 | Zidar et al. |
| 2005/0035265 | A1 | | 2/2005 | Dubensky et al. |

* cited by examiner

*Primary Examiner* — Anita M King
(74) *Attorney, Agent, or Firm* — Patterson Thuente Christensen Pedersen, P.A.

(57) ABSTRACT

A base/lifting structure, includes a base frame assembly and a plurality of readily removable lifting bracket channels, the base frame assembly and a plurality of readily removable lifting bracket channels each having structural elements, the structural elements being formed of galvanize sheet metal formed in a C-shape cross section, the structural elements being selectively utilized in the base frame assembly singly and in pairs. A method of forming a base/lifting structure is further included.

14 Claims, 4 Drawing Sheets

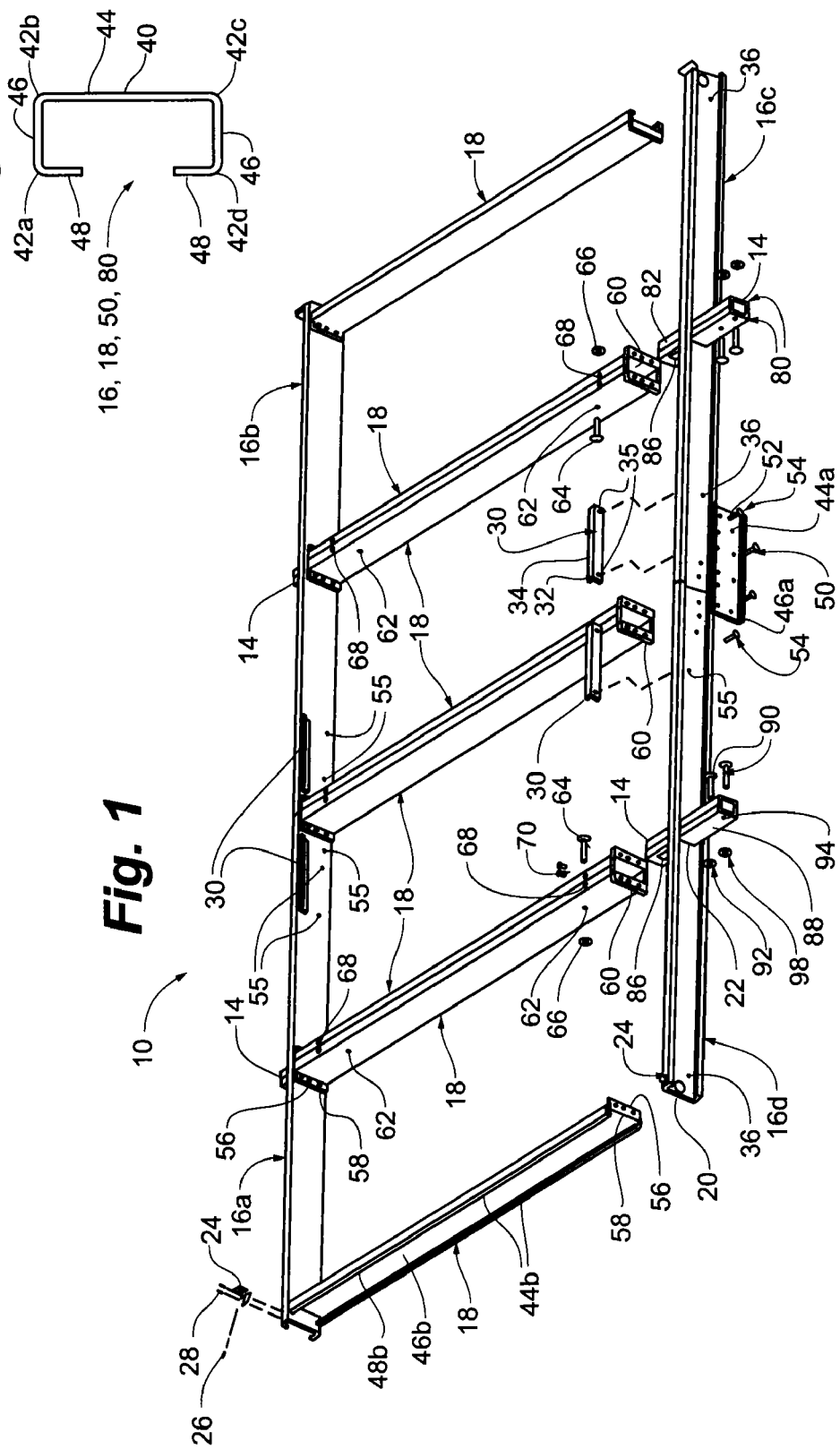

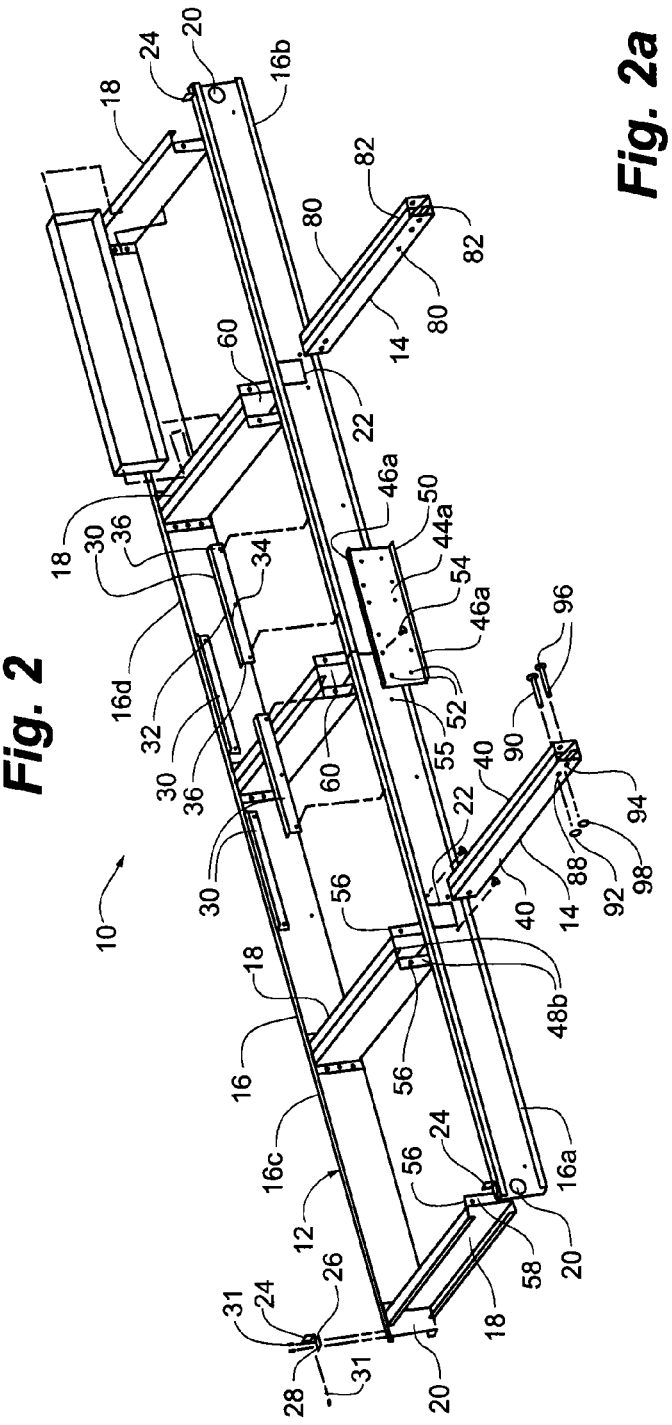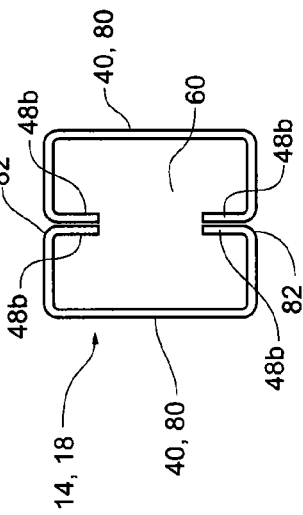

BASE/LIFTING STRUCTURE

RELATED APPLICATION

This application claims the benefit of U.S. Provisional Application No. 61/012,201 filed Dec. 7, 2007, and incorporated herein in its entirety by reference.

FIELD OF THE INVENTION

This invention relates generally to improvements in structures and apparatus used primarily in the field of handling HVAC components, and more particularly to a lifting structure, and its particular combination of elements, that provide a unique cooperation of such elements for raising through a rigging system large HVAC components to a desired operating position proximate a structure. While the particular structure disclosed herein is directed primarily to equipment used in the building industry, it will be understood that this invention is capable of being used in other allied fields such as warehousing for raising material to be stored in bins and elevated positions, truck and aircraft loading, and the like.

BACKGROUND OF THE INVENTION

There is a need for an efficient way to move air handler units (AHU) to operational positions, frequently on the roof of a structure. Previously only structural steel, welded bases attached to the AHU could achieve the strength and torsion resistance that we have realized in this design.

SUMMARY OF THE INVENTION

The present invention is a design for a lifting structure that is made of formed sheet metal which is bolted together. The main advantage for this type of lifting member is that it is made from formed sheet metal and requires no welding. When constructed these brackets become a "box in box" design. This achieves significant strength in all moment directions. By connecting the lifting bracket directly though the base structure it is able to resist the common "twist out" moment on the base channels.

The structure has two separate designs. The first embodiment of these is for the longer sections (greater than 49"). In this design the lifting brackets can be contracted inside the base channels. This allows the adjoining section to be connected without interference.

The second embodiment of these designs is for shorter sections (less than 49"). This design lifts the same but can be completely removed for installation of adjoining sections.

The lifting bracket allows for safe attachment from several types of rigging equipment including shackles, hooks, and locking hooks. The units can then be lifted using straps, cables, or chains rated for weight. The shorter span between lift points allows the lift angle to be less which decreases the tension needed from the rigger to lift the unit. The shorter span also allows the unit to be counterweighted by its own mass. This counterweight means a large amount of weight can be lifted without the base rails yielding. With this the main base channel was able to be split into two members so the factory can better handle the parts.

This lifting design allows for all of the variations in the McQuay Vision AHU including height, length and width. This type of structure is significantly safer than the current Vision rigging design and will incorporate itself well in the extended vision units especially because the sections can be nearly double the current max weight. The bracket extends beyond the edge of the unit to protect the splice collar and the ceiling of the unit resulting in less installation damage. This lifting design offers a competitive advantage against custom AHU manufacturers without adding structural steel or making any heavier components than used today.

The present invention is a base/lifting structure, including a base frame assembly and a plurality of readily removable lifting bracket channels, the base frame assembly and a plurality of readily removable lifting bracket channels each having structural elements, the structural elements being formed of galvanized sheet metal formed in a C-shape in cross section, the structural elements being selectively utilized in the base frame assembly singly and in pairs. A method of forming a base/lifting structure is further included.

Other variations to the present invention are within the scope of the present disclosure. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives.

BRIEF DESCRIPTION OF THE DRAWINGS

FIG. 1 is a partially exploded perspective view of a base/lifting structure of the present invention;

FIG. 1a is sectional view of a base rail, cross rail, and lifting bracket channel of the present invention;

FIG. 2 is a partially exploded perspective view of a second embodiment of the base/lifting structure of the present invention.

FIG. 2a is cross sectional view of a lifting bracket channel and a cross rail of the present invention;

DETAILED DESCRIPTION OF THE EMBODIMENTS

Figure 3:
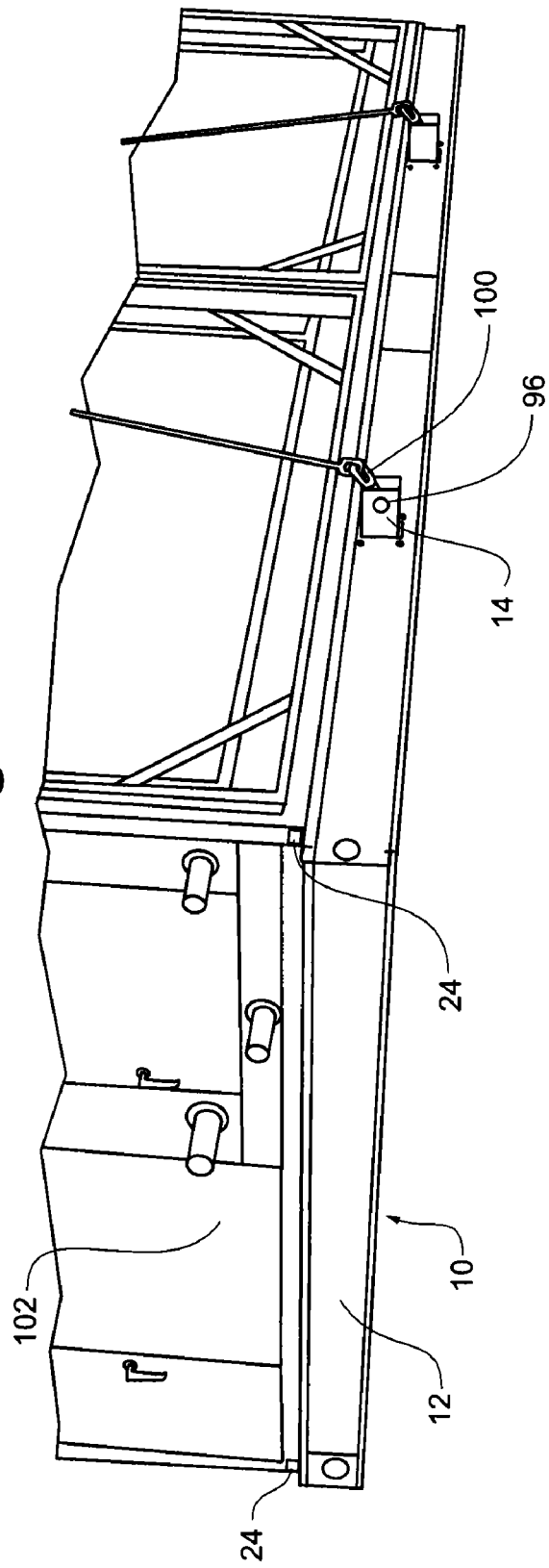
FIG. 3 is a perspective view of a base/lifting structure supporting a HVAC unit.
Figure 4:
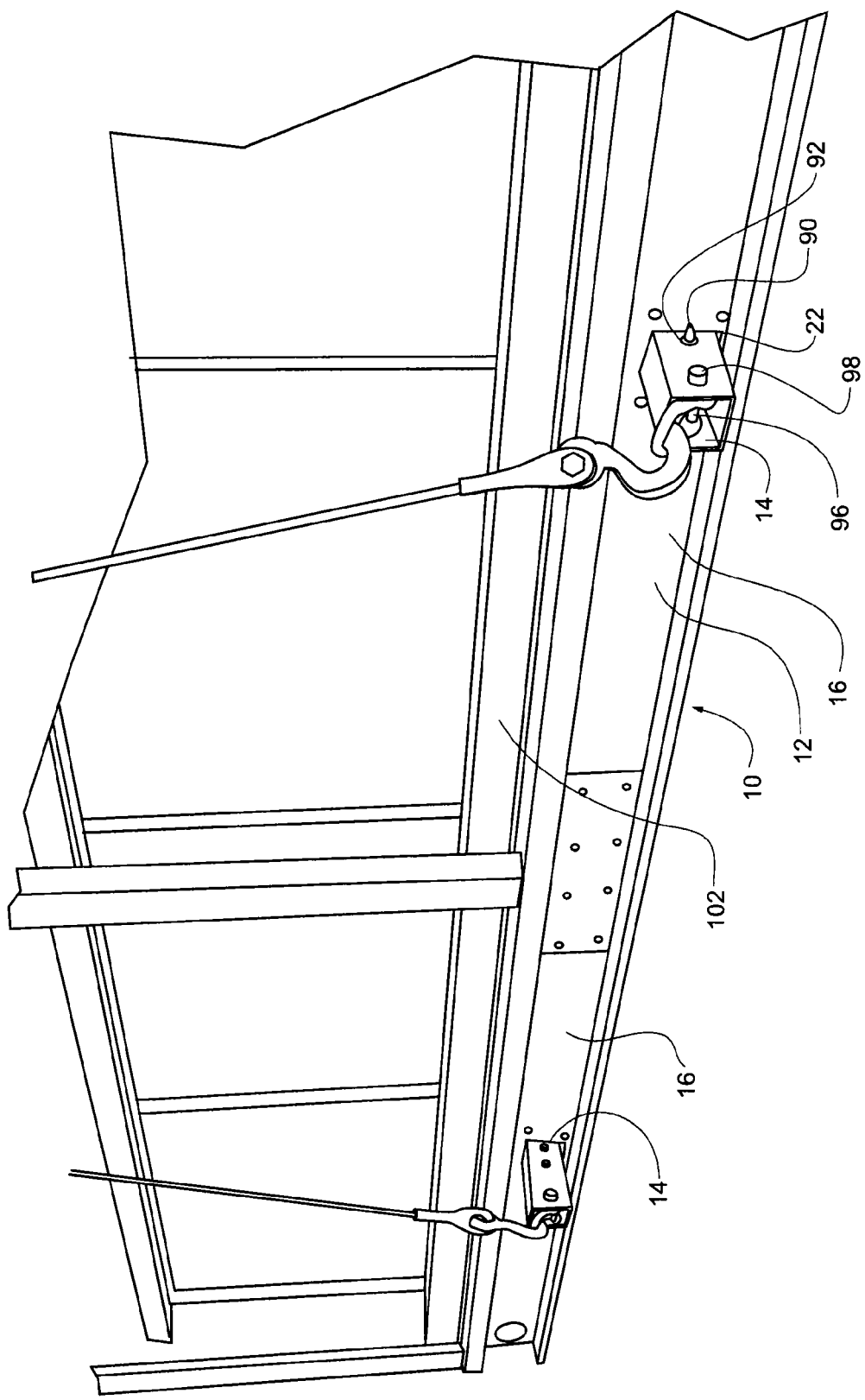
FIG. 4 is a perspective view of a base/lifting structure supporting a HVAC unit.

The base/lifting structure of the present invention is shown generally at 10 in the figures. The base/lifting structure 10 effectively performs two functions with regard to a commercial HVAC unit 102. The first function is as a means to lift an HVAC unit 102 for disposing the HVAC unit 102 on a truck bed or a transport. (See FIG. 3.) Additionally, an HVAC unit 102 may be lifted by a crane or the like being coupled to the base/lifting structure 10 for disposition on the roof of a building.

The second function that the base/lifting structure 10 performs is as a base for the HVAC unit 102 once the HVAC unit 102 is positioned in place on the roof of the building.

It should be noted that all of the structure elements of the base/lifting structure 10 are formed of galvanized sheet metal that has four bends to define a C-shape in cross section. In the past, bases for HVAC units 102 have been formed of welded structure. The structural elements of the present invention are readily formed simply by bending and are therefore significantly less expensive than a welded base.

The base/lifting structure 10 includes two subcomponents; base frame assembly 12, and lifting bracket channel 14. The base frame assembly 12 includes a plurality of base rails 16 and a plurality of cross rails 18. The lifting bracket channel 14, base rails 16, and cross rails 18 comprise the structural elements of the base/lifting structure 10 that is formed of the galvanized sheet metal noted above.

The base frame assembly 12 of the base/lifting structure 10, as depicted in FIG. 1, includes four base rails 16 noted as rails 16a-d. It is to be understood that more or fewer base rails 16 could be utilized depending on the size of the base/lifting structure 10 that is needed.

Each of the base rails 16 includes at a first end a tie down bore 20. The tie down bore 20 is preferably used during transport of an HVAC unit 102 mounted on the base/lifting structure 10. Typically, conventional tie down chains are coupled to the tie down bore 20 and to a suitable coupling on the bed of the truck.

A plurality of preferably rectangular channel apertures 22 are defined in the base rails 16. In the depiction of FIG. 1, a single channel aperture 22 is defined in each of the base rail 16 proximate longitudinal center of the respective base rail 16.

An angle bracket 24 is preferably disposed at the end of the respective base rail 16 proximate the tie down bore 20. The upward directed angle bracket 24 has a horizontal bore 26 and a vertical bore 28. The angle bracket 24 is preferably bolted to the respective base rail 16 by passing a bolt 31 through the horizontal bore 26 and a corresponding bore defined in the respective base rail 16. The HVAC unit 102 that is supported by the base/lifting structure 10 may be physically coupled to the base/lifting structure 10 by means of a bolt 31 passed through the vertical bore 28 of the angle bracket 24 and through a corresponding bore defined in the HVAC unit 102.

It should be noted in FIG. 1 that the sides of the base frame assembly 12 are each formed of two base rails 16 abutted together in the center of the base frame assembly 12. In order to strengthen the joint at the abutment of the two base rails 16, an angle to base device 30 is coupled to each of the respective base rails 16 proximate the juncture of two respective base rails 16. The angle to base device 30 has a horizontal side 32 and a vertical side 34. Fastener bores 35, 36 are defined in the angle to base device on the respective sides 32, 34.

Each of the base rails 16 has a cross section that defines a C-channel 40 as depicted in FIG. 1a. The C-channel 40 is formed by forming four bends 42a-d in the galvanized sheet metal that forms the base rail 16. Accordingly, the base rail 16, and for that matter the cross rail 18 and the channel members 80, has a vertical side 44, a horizontal side 46 and two inward directed opposed tabs 48.

A joining channel 50 is employed at the juncture of the two base rails 16 forming a side of the base frame assembly 12. Each of the joining channels 50 is formed in the C-channel shape 40 as depicted in Fig. 1a. Accordingly, the joining channel 50 has a vertical side 44a and a horizontal side 46a. The joining channel 50 is formed slightly smaller than the C-channel 40 that forms the base rails 16 so that the joining channel 50 can reside within the interior space formed by the C-channel 40 forming the respective base rails 16. A plurality of bores 52 are formed in the vertical side 44a of the joining channel 50. Screws 54 are passed through the bores 52 and threaded into corresponding bores 55 formed in the vertical side 44a of the base rail 16. At least two of the screws 54 pass through the vertical side 44a of the base rail 16 and are threadedly engaged with the fastener bores 35 defined in the vertical side 34 of the angle to base device 30.

The second major structural component of the base frame assembly 12 are the cross rails 18. The cross rails 18 have a C-shaped channel 40 as depicted in FIG. 1a. The dimensions of the C-shaped channel 40 of the cross rail 18 are preferably the same as the dimensions of the C-shaped channel 40 of the base rail 16. The base rails 16 can be employed either singly or in pairs. As noted in FIG. 1, the cross rails 18 that are employed at the end of the base frame assembly 12 are used singly, while the cross rails 18 that are employed in the center portion of the base frame assembly 12 are utilized in pairs.

As illustrated in FIG. 1, the cross rail 18 has a C-channel 40, including a vertical side 44b, a horizontal side 46b, and inward directed tabs 48b. An opposed end tab 56 is formed at both ends of the cross rail 18. The opposed end tab 56 has the same height dimension as the vertical side 44b and is bent away from the C-channel 40. A plurality of bores 58 are defined in the end tab 56.

Referring to the cross rails 18 that are used in pairs, the two cross rails are disposed with the opening defined by the C-channel 40 facing one another, as depicted in FIG. 2a.

Accordingly, the outer margin of the respective inward directed tabs 48b of a first cross rail 18 are abutting the outer margin of the inward directed tab 48 on the second cross rail 18. In this manner, a longitudinal aperture 60 is defined by the two cross rails 18 when used in pairs.

Opposed bores 62 are defined in the pair of cross rails 18. A cross bolt 64 and associated nut 66 may be disposed in the bores 62. Pin bores 68 are defined in the upper most horizontal side 46b proximate the respective ends of the cross rails 18 when used in pairs. A pin 70 may be disposed in each of the respective pin bores 68.

The second of the structures of the base/lifting structure 10 is the lifting bracket channel 14. Each lifting channel bracket 14 is formed of opposed channel members having a cross section similar to the cross section of FIG. 1a and paired as depicted in FIG. 2a. The dimensions of the channel members 80 are such that the lifting bracket channel 14 may readily pass through the channel aperture 22 and be shiftably received within the longitudinal aperture 60 defined in paired cross rail 18. As noted in FIG. 2a, a pair of longitudinal grooves 82 are formed between the two mated channel members 80 forming the lifting bracket channel 14.

A cross bolt slot 86 is formed in each of the channel members 80 proximate the interior disposed end of the lifting bracket channel 14. The cross bolt 64 and nut 66 may be passed through the cross bolt slot 86 to selectively fix the lifting bracket channel 14 within the longitudinal aperture 60 of the paired cross rail 18. Bores 88 defined in each of the channel members 80 forming a respective lifting bracket channel 14 may accommodate a bolt 90 and nut 92 for securing the two channel members 80 together.

A bore 94 is defined proximate the exterior disposed end of the lifting bracket channel 14. The lifting device bolt 96 may be passed through the cooperative bores 94 and through a lifting device 100 as depicted in FIG. 3. The lifting device bolt 96 may be secured by a nut 98. A number of differently configured lifting devices 100 may be so secured to the lifting bracket channel 14 to facilitate lifting of the base/lifting structure 10 and a HVAC unit 102 mounted thereon. It should be noted that the lifting bracket channel 14 as depicted in FIG. 1, is relatively short as compared to the length of the cross rail 18. Only a limited portion of the lifting bracket channel 14 passes into the longitudinal aperture 60 defined in the cross rail 18. Accordingly, there are four lifting bracket channels 14 employed with the base/lifting structure 10 of FIG. 1.

FIG. 2 depicts a second embodiment of the base/lifting structure 10. The base/lifting structure 10 of FIG. 2 is considerably more narrow as compared to the base/lifting structure 10 of FIG. 1. Each of the features of the base/lifting structure 10 of FIG. 1 is incorporated into the base/lifting structure 10 of FIG. 2, with the exception of the design of the lifting bracket channels 14. In the case of FIG. 2, the length dimension of the two lifting bracket channels 14 is greater than the width dimension of the base/lifting structure 10.

Accordingly, when the lifting bracket channel 14 is disposed within the longitudinal aperture 60 defined in the cross rail 18, the two ends of the lifting bracket channel 14 project outward from the base rail 16 of the base frame assembly 12. Accordingly, only two lifting bracket channels 14 are utilized with the base/lifting structure 10 of FIG. 2.

What is claimed is:

1. A base/lifting structure, comprising:
a base frame assembly and a plurality of readily removable lifting bracket channels, the base frame assembly and the plurality of readily removable lifting bracket channels each having structural elements, the structural elements being formed of galvanized sheet metal formed in a C-shape cross section, the structural elements being selectively utilized in the base frame assembly singly and in pairs, said base frame assembly including a plurality of cross rails, the lifting bracket channels having a substantially greater length dimension as compared to the length dimension of the cross rails.

2. The base/lifting structure of claim 1, the C-shape of the structural elements being formed of four substantially right angle bends.

3. The base/lifting structure of claim 1, the base frame assembly having structural elements comprising a plurality of base rails and a plurality of cross rails.

4. The base/lifting structure of claim 1, the base frame assembly being a substantially rectangular structure having two C-shaped opposed sides and two opposed C-shaped ends, each of the two opposed sides being formed of at least two abutting base rails and each of the two opposed ends being formed of a cross rail.

5. The base/lifting structure of claim 4, the C-shaped opposed sides and opposed C-shaped ends being substantially identical in cross section.

6. The base/lifting structure of claim 1, the base frame assembly having at least two cross rails being formed of two paired, opposed C-shaped structural elements.

7. The base/lifting structure of claim 6, the two paired, opposed C-shaped structural elements defining a longitudinal aperture, the longitudinal aperture being capable of receiving a lifting bracket channel therein.

8. The base/lifting structure of claim 1, the lifting bracket channels being formed of two paired, opposed C-shaped structural elements.

9. The base/lifting structure of claim 8, the two paired, opposed C-shaped structural elements forming the lifting bracket channels having cross sectional dimensions less than the cross sectional dimensions of the C-shaped structural elements forming the base frame assembly.

10. The base/lifting structure of claim 1, the lifting bracket channels including at least one means for securing a lifting device to the lifting bracket channels.

11. The base/lifting structure of claim 1, the lifting bracket channels including at least one lifting device.

12. The base/lifting structure of claim 1, the base frame assembly being formed of couplable structural elements, the coupling of the structural elements being effected by means other than welding.

13. A method of forming base/lifting structure, including:
forming a base frame assembly and a plurality of readily removable lifting bracket channels of structural elements, the structural elements forming a plurality of readily removable lifting bracket channels, forming the structural elements of galvanized sheet metal formed in a C-shape in cross section, selectively utilizing the structural elements in the base frame assembly singly and in pairs, and forming the base frame assembly of a substantially rectangular structure having two C-shaped opposed sides and two opposed C-shaped ends, each of the two opposed sides being formed of at least two abutting base rails and each the two opposed ends being formed of a cross rail, wherein the base frame assembly includes a plurality of cross rails, the lifting bracket channels have a greater length dimension as compared to the length dimension of the cross rails.

14. The method of claim 13, including forming the C-shape of the structural elements of four substantially right angle bends.

* * * * *